US008490909B2

(12) United States Patent
Takamatsu et al.

(10) Patent No.: US 8,490,909 B2
(45) Date of Patent: Jul. 23, 2013

(54) DUAL-BEARING REEL DRAG SOUND PRODUCING DEVICE

(75) Inventors: Takuji Takamatsu, Osaka (JP); Akira Niitsuma, Osaka (JP); Kouji Ochiai, Osaka (JP); Kunio Takechi, Osaka (JP)

(73) Assignee: Shimano Inc., Osaka (JP)

( * ) Notice: Subject to any disclaimer, the term of this patent is extended or adjusted under 35 U.S.C. 154(b) by 142 days.

(21) Appl. No.: 13/189,755

(22) Filed: Jul. 25, 2011

(65) Prior Publication Data

US 2012/0018562 A1    Jan. 26, 2012

(30) Foreign Application Priority Data

Jul. 26, 2010  (JP) .................................. 2010-167326

(51) Int. Cl.
*A01K 89/01*         (2006.01)
(52) U.S. Cl.
USPC .......................................... 242/307; 242/306
(58) Field of Classification Search
USPC .......................... 242/305, 306, 307, 308, 309
See application file for complete search history.

(56) References Cited

U.S. PATENT DOCUMENTS

| 2,417,732 | A | * | 3/1947 | Bland et al. ..................... | 242/255 |
| 4,162,049 | A | * | 7/1979 | Stutz, Jr. ........................ | 242/292 |
| 4,570,878 | A | * | 2/1986 | Nakajima ....................... | 242/261 |
| 5,265,824 | A | * | 11/1993 | Sato ............................... | 242/268 |
| 6,688,545 | B2 | * | 2/2004 | Kitajima et al. ............... | 242/306 |
| 6,971,601 | B2 | * | 12/2005 | Sugawara ...................... | 242/307 |
| 7,175,121 | B2 | * | 2/2007 | Ikuta .............................. | 242/307 |
| 2005/0006512 | A1 | | 1/2005 | Morimoto et al. | |
| 2006/0169813 | A1 | | 8/2006 | Nakagawa et al. | |
| 2008/0173745 | A1 | | 7/2008 | Takechi et al. | |
| 2010/0006689 | A1 | * | 1/2010 | Ikuta et al. .................... | 242/306 |
| 2011/0011968 | A1 | | 1/2011 | Ikuta | |

FOREIGN PATENT DOCUMENTS

| EP | 2 119 349 A1 | 11/2009 |
| EP | 2 143 328 A1 | 1/2010 |
| EP | 2 347 650 A1 | 7/2011 |
| JP | 2535459 Y | 2/1997 |

OTHER PUBLICATIONS

Extended European Search Report of the corresponding European Application No. 11170451.6, dated Oct. 18, 2011.

* cited by examiner

*Primary Examiner* — Emmanuel M Marcelo
(74) *Attorney, Agent, or Firm* — Global IP Counselors, LLP

(57) ABSTRACT

The dual-bearing reel drag sound producing device includes a rotation member, a pivot shaft, a hitting member, a drive mechanism, and an urging member. The rotation member is disposed adjacent to the side cover to rotate unitarily with a main gear, and includes a plurality of sound producing convexes on an outer peripheral surface thereof. The hitting member is attached on the pivot shaft to move radially at a predetermined distance from the pivot shaft and configured to pivot between a silent position and a sound producing position. The drive mechanism is configured to cause the hitting member to pivot from the silent position to the sound producing position and further to a position being opposite to the silent position across the sound producing position, in conjunction with rotation of the main gear. The urging member is configured to urge the hitting member towards the sound producing position.

7 Claims, 7 Drawing Sheets

DUAL-BEARING REEL DRAG SOUND PRODUCING DEVICE

CROSS-REFERENCE TO RELATED APPLICATIONS

This application claims priority to Japanese Patent Application No. 2010-167326 filed on Jul. 26, 2010, the entirety of which is hereby incorporated by reference in its entirety.

BACKGROUND OF THE INVENTION

1. Field of the Invention

The present invention relates to a sound producing device, particularly to a drag sound producing device configured to produce sounds in conjunction with activation of a drag mechanism in a dual-bearing reel configured to wind a fishing line about an axis arranged in parallel to a handle shaft rotatably attached to a reel unit.

2. Background Art

The dual-bearing reels of some types include a drag sound producing device configured to inform an angler of drag activation. For example, Japanese Utility Model Registration No. 2,535,459 discloses a drag sound producing device which produces sounds only when a spool is rotated in a fishing-line releasing direction. The drag sound producing device of the well-known type includes a rotation member to rotate in conjunction with the main gear, a hitting member, a drive mechanism, and an urging member. The hitting member is to make contact with or move away from the rotation member. The drive mechanism separates the hitting member away from the rotation member in conjunction with rotation of the rotation member in a fishing-line releasing direction. The urging member urges the hitting member. The hitting member is positioned for making contact with the rotation member. The hitting member is disposed on the far side of the main gear while being closer to a ratchet wheel than the main gear is. The term "far side" herein refers to a side being separate away from one of the side covers which is attached on the handle-side of the reel unit of the dual-bearing reel.

An interposed plate is attached to a claw member of a one-way clutch. The interposed plate moves the claw member away from the ratchet wheel in conjunction with rotation of the handle shaft in a fishing-line winding direction. The interposed plate is frictionally coupled to the ratchet wheel attached onto the handle shaft. The hitting member is pivotally attached to either the reel unit or the claw member of the one-way clutch. The claw member, functioning as a drive mechanism, is configured to cause the hitting member to pivot between a contact position and a remote position depending on the spool rotational direction.

According to the drag sound producing device with the aforementioned structure, the hitting member is moved to the remote position by the claw member in conjunction with the spool rotation in the fishing-line winding direction. The drag sound producing device does not produce sounds under the condition. When the spool is rotated in the fishing-line releasing direction, on the other hand, the claw member is engaged with the ratchet wheel. The handle shaft is thereby prevented from rotating. The main gear, rotating in the fishing-line releasing direction, is braked and the drag mechanism is activated. When the main gear is rotated in the fishing-line releasing direction under the activation of the drag mechanism, the hitting member is moved to the contact position by the claw member. When being disposed in the contact position, the hitting member is urged by the urging member and is vibrated in conjunction with rotation of the main gear in the fishing-line releasing direction. The drag sound producing device thus produces sounds.

SUMMARY

In the aforementioned well-known structure, the hitting member is disposed on the far side of the main gear when the rotation member is used. Further, the rotation member is also disposed on the far side of the main gear. A variety of mechanisms are disposed on the far side of the main gear, including a rotation transmission mechanism for a level wind mechanism, an anti-reverse mechanism, and a clutch return mechanism. Therefore, the rotation member and the hitting member are should be disposed without spatially interfering with the various mechanisms. To avoid spatial interference of the rotation member and the hitting member with the various mechanisms, the rotation member and the hitting member are should be outwardly displaced along the axial direction of the handle shaft. The axial length of the handle shaft is should be increased when the rotation member and the hitting member are thus displaced along the axial direction of the handle shaft. In other words, the axial length of the dual-bearing reel is required to be increased. Consequently, the entire size of the dual-bearing reel is required to be increased.

The present invention addresses a need to dispose a drag sound producing device in a dual-bearing reel without increasing the length of the dual-bearing reel in the axial direction of a handle shaft as much as possible.

A dual-bearing reel drag sound producing device is provided. The dual-bearing reel drag sound producing device is configured to wind a fishing line about an axis arranged in parallel to a handle shaft rotatably attached to both a side cover and a frame of a reel unit of the dual-bearing reel. The dual-bearing reel drag sound producing device is configured to produce sound in conjunction with using a drag mechanism. The dual-bearing reel drag sound producing device includes a rotation member, a pivot shaft, a hitting member, a drive mechanism, and an urging member. The rotation member is disposed adjacent to the side cover to rotate unitarily with a main gear, the rotation member including a plurality of sound producing convexes on an outer peripheral surface thereof. The sound producing convexes are circumferentially aligned at predetermined intervals. The pivot shaft is configured on the side cover. The hitting member is attached on the pivot shaft to move radially at a predetermined distance from the pivot shaft and configured to pivot from a silent position to a sound producing position and further to a position. The silent position is for allowing the hitting member to be separate away from the sound producing convexes. The position is opposite to the silent position across the sound producing position. The sound producing position is for allowing the hitting member to make contact with the sound producing convexes. The drive mechanism is configured to cause the hitting member to pivot from the sound producing position to the silent position in conjunction with rotation of the main gear in a fishing-line winding direction. The urging member is configured to urge the hitting member towards the sound producing position.

BRIEF DESCRIPTION OF THE DRAWINGS

Referring now to the attached drawings which form a part of this original disclosure.

DETAILED DESCRIPTION OF THE PREFERRED EMBODIMENTS

First Exemplary Embodiment

Figure 1:
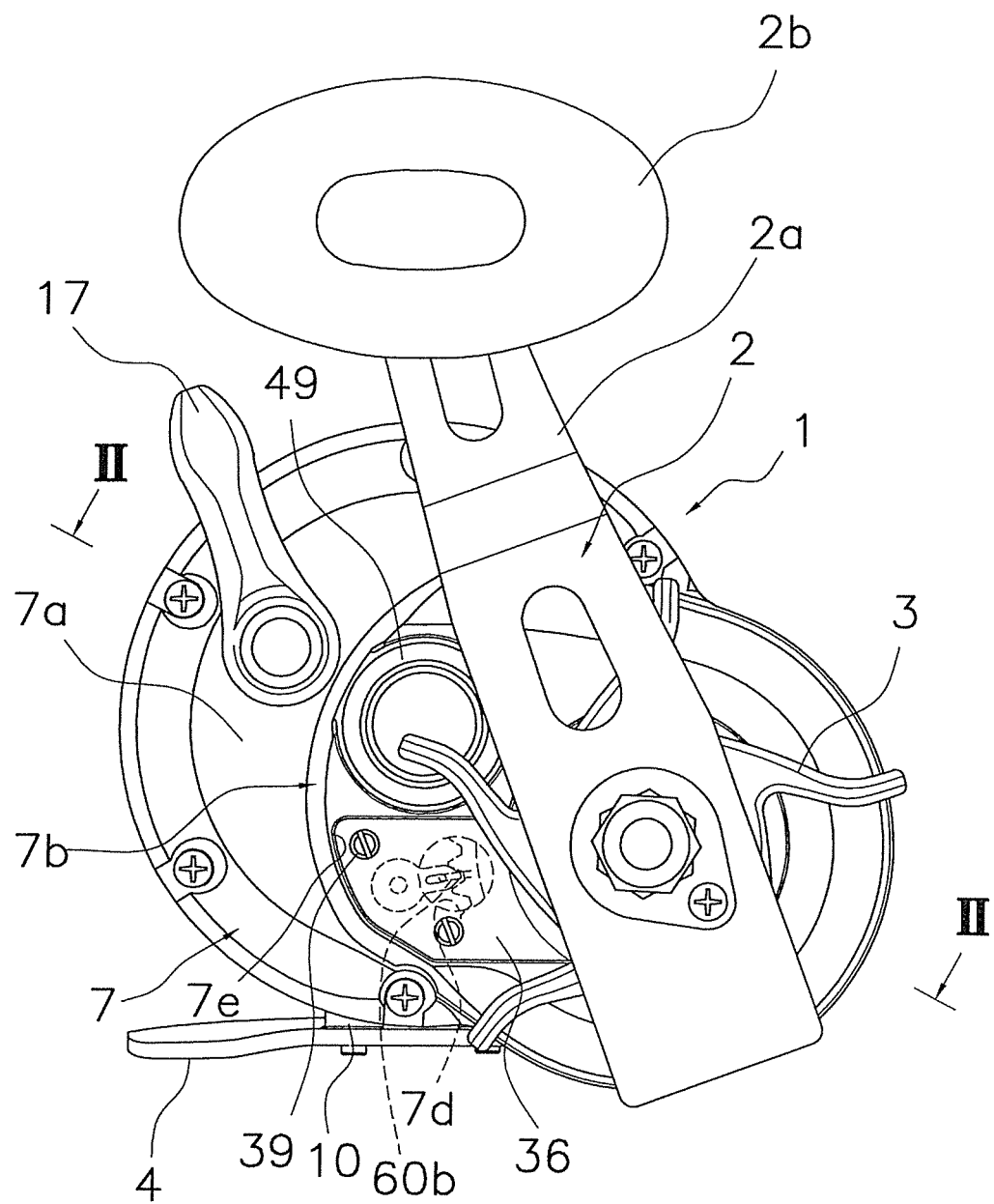
FIG. 1 is a side view of a dual-bearing reel adopting an exemplary embodiment of the present invention.
Figure 2:
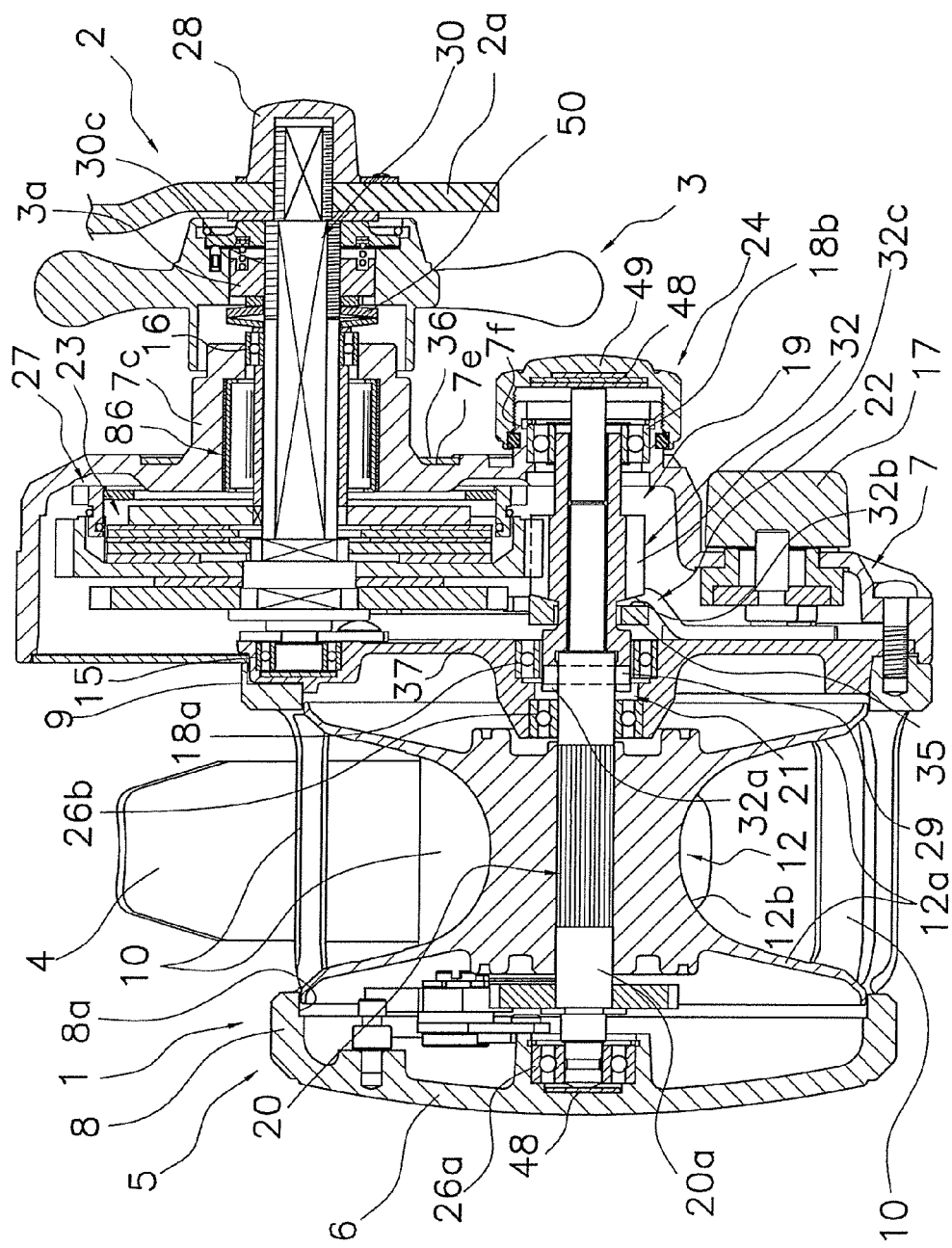
FIG. 2 is a cross-sectional view of the dual-bearing reel sectioned along a line II-II in FIG. 1.

FIGS. 1 and 2 illustrate a round dual-bearing reel to be used for bait casting, jigging, and the like as a dual-bearing reel adopting an exemplary embodiment of the present invention. The dual-bearing reel includes a reel unit 1, a handle 2 and a spool 12. The handle 2 is a component disposed lateral to the reel unit 1 for rotating the spool 12. The spool 12 is attached to the inside of the reel unit 1 in a rotatable state.

In the following explanation, the directional terms "front", "rear", "right" and "left" will be defined as follows. The term "front" refers to a direction that a fishing line is released while the dual-bearing reel is attached to a fishing rod, whereas the term "rear" refers to the direction opposite thereto. The terms "right" and "left" refer to the directions in a rear view of the dual-bearing reel.

The handle 2 is of a single-handle type including a plate-shaped arm 2a and a knob 2b attached to the tip of the arm 2a in a rotatable state. As illustrated in FIG. 2, the arm 2a is attached to the tip of a handle shaft 30 while being unitarily rotatable therewith. The arm 2a is fixed onto the handle shaft 30 by a nut 28.

As illustrated in FIG. 2, the reel unit 1 includes a frame 5 and a pair of first and second side covers 6 and 7 attached to the both lateral sides of the frame 5. The reel unit 1 is a member made of metal, for instance, aluminum alloy, magnesium alloy or the like. The spool 12 is rotatably attached to the inside of the reel unit 1 through a spool shaft 20. The frame 5 includes a right and left pair of first and second side plates 8 and 9 and a plurality of coupling portions 10. The first and second side plates 8 and 9 are disposed at a predetermined interval. The coupling portions 10 couples the first and second side plates 8 and 9. The first side plate 8 has a diameter less than that of the second side plate 9.

The coupling portions 10 are integrally formed with the first and second side plates 8 and 9. As illustrated in FIG. 1, a fishing rod attachment leg 4 is riveted to the lower one of the coupling portions 10. The fishing rod attachment leg 4 is elongated in a back-and-forth direction for attaching the dual-bearing reel thereto. The fishing rod attachment leg 4 is made of metal such as aluminum alloy.

Laterally seen along the axial direction of the spool shaft, the first side cover 6 has a circular shape. The first side cover 6 is integrally formed with the first side plate 8. The first side cover 6 supports the left end of the spool shaft 20 for allowing it to rotate.

As illustrated in FIG. 1, the second side cover 7 includes a circular portion 7a and a bulged portion 7b protruded axially and radially outwards from the circular portion 7a. The bulged portion 7b has a deformed oval shape in a side view.

The bulged portion 7b includes a tubular first boss 7c for supporting the handle shaft 30. Further, the bulged portion 7b includes a circular opening 7d formed rearwards of the first boss 7c. Yet further, the bulged portion 7b includes a slightly recessed name plate attachment portion 7e. The name plate attachment portion 7e is formed rearwards of and in the surrounding of the first boss 7c and includes the opening 7d. The opening 7d is formed for easily assembling a drag sound producing mechanism 27 to be described. Further, the opening 7d is used as a drainage hole and a lubrication port. A name plate 36 is attached to the name plate attachment portion 7e. When the name plate 36 is attached to the name plate attachment portion 7e, the opening 7d is covered with the name plate 36 and is thereby invisible from the outside. The name plate 36 is attached to the name plate attachment portion 7e by, for instance, two screw members 39. A second boss 7f is formed above the name plate attachment portion 7e for disposing one of the axial ends of the spool shaft 20 therein.

As illustrated in FIG. 2, the second side cover 7 supports the handle shaft 30 for allowing it to rotate. A clutch lever 17 is attached to the rear part of the second side cover 7. A mechanism attachment plate 37, which forms the frame 5, is disposed between the second side cover 7 and the second side plate 9.

As illustrated in FIG. 2, a gear mechanism 19, a clutch mechanism 21, a clutch control mechanism 22, a drag mechanism 23, a casting control mechanism 24, and the drag sound producing mechanism 27 (an example of the drag sound producing device according to a first exemplary embodiment of the present invention) are disposed between the second side cover 7 and the mechanism attachment plate 37. The gear mechanism 19 is configured to transmit torque from the handle 2 to the spool 12. The clutch mechanism 21 is configured to couple and decouple the handle 2 and the spool 12. When the clutch mechanism 21 is set to be in a clutch-off state (i.e., a decoupled state), the spool 12 is allowed to freely rotate. The clutch control mechanism 22 includes a clutch yoke 22a and a clutch plate (not illustrated in the figures). The clutch control mechanism 22 is configured to control the state of the clutch mechanism 21 between a clutch-on state (i.e., a coupled state) and the clutch-off state in response to the operation of the clutch lever 17. The drag mechanism 23 is configured to brake rotation of the spool 12 in the fishing-line releasing direction. The casting control mechanism 24 is configured to adjust resistive force to be applied when the spool 12 is rotated. The drag sound producing mechanism 27 is configured to produce sounds in conjunction with rotation of when the spool 12 in the fishing-line releasing direction. Further, a spool lock mechanism (not illustrated in the figures) is disposed between the spool 12 and the first side cover 6. The spool lock mechanism is configured to lock and unlock rotation of the spool 12 in the fishing-line releasing direction.

As illustrated in FIG. 2, the spool 12 includes a right and left pair of saucer-shaped flanges 12a on the both axial sides thereof. The spool 12 further includes a tubular-shaped bobbin trunk 12b between the pair of the flanges 12a. To prevent the fishing line from getting stuck, the outer peripheral surface of the left-side flange 12a (see FIG. 2) is disposed on the inner peripheral side of an opening 8a while a slight clearance is made therebetween. The spool 12 is fixed to the spool shaft 20 penetrating through the inner peripheral side of the bobbin trunk 12b by serration coupling or the like. The method of fixing the spool 12 to the spool shaft 20 is not limited to serration coupling. A variety of coupling methods (e.g., key coupling or spline coupling) can be used for coupling the spool 12 to the spool shaft 20.

As illustrated in FIG. 2, the spool shaft 20 is disposed in parallel to the handle shaft 30. The spool shaft 20 is made of non-magnetic metal such as SUS304. The spool shaft 20 is extended to the second boss 7f of the second side cover 7 while penetrating through the second side plate 9. The spool shaft 20 is rotatably supported by the reel unit 1 through a first bearing 26a and a second bearing 26b at the both axial ends of the spool 12. The spool shaft 20 includes a large-diameter portion 20a in the center part thereof. An engagement pin 29, which forms a part of the clutch mechanism 21, is fixed to the large-diameter portion 20a. The engagement pin 29 penetrates through the large-diameter portion 20a along the diameter of the large-diameter portion 20a. The both axial ends of the engagement pin 29 are radially protruding from the large-diameter portion 20a.

The clutch lever 17 is pivotally attached to the rear part of the second side cover 7. The clutch lever 17 is coupled to the clutch control mechanism 22. The clutch mechanism 21 is set to be in the clutch-on state or the clutch-off state in conjunction with pivot of the clutch lever 17.

Figure 4:
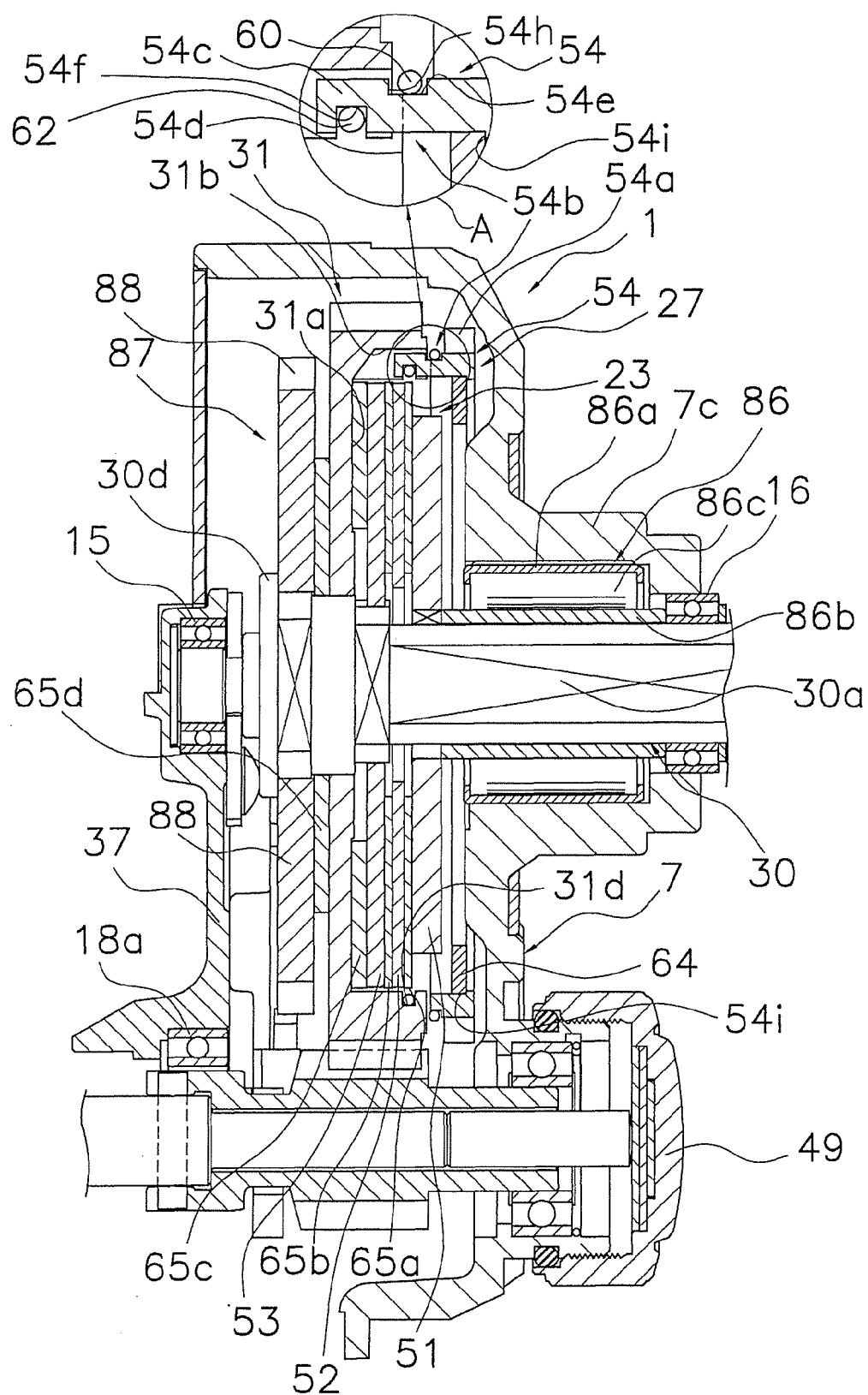
FIG. 4 is an enlarged cross-sectional view of the drag mechanism and its periphery in FIG. 2.

As illustrated in FIG. 4, the gear mechanism 19 includes the handle shaft 30, a main gear 31 fixed onto the handle shaft 30, and a tubular-shaped pinion gear 32 meshed with the main gear 31.

Figure 3:
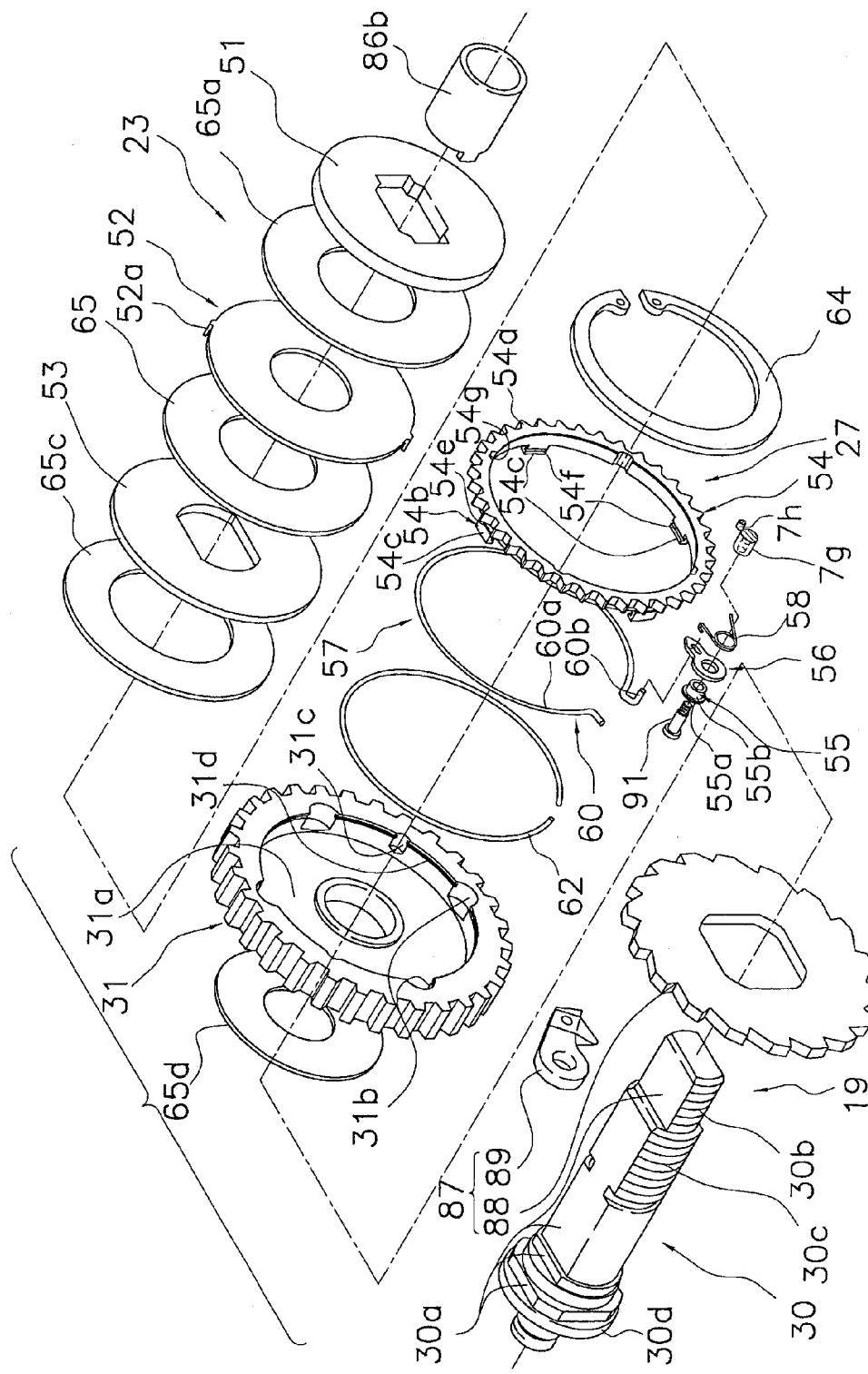
FIG. 3 is an exploded perspective view of a rotation transmission mechanism including a drag sound producing mechanism and a drag mechanism.

The handle shaft 30 is rotatably attached to the mechanism attachment plate 37 and the second side cover 7 through a bearing 15 and a bearing 16 (see FIG. 2). As illustrated in FIG. 3, the handle shaft 30 includes a plurality of anti-rotation portions 30a on the outer peripheral surface thereof. Each anti-rotation portion 30a is formed by a pair of parallel cut-out surfaces. Further, the handle shaft 30 includes a first male threaded portion 30b and a second male threaded portion 30c. The first male threaded portion 30b fixes the arm 2a of the handle 2 thereto, whereas the second male threaded portion 30c is configured to adjust drag force of the drag mechanism 23. As illustrated in FIG. 4, the handle shaft 30 is prevented from being rotated in the fishing-line releasing direction (i.e., reverse direction) by a first one-way clutch 86 of a roller type and a second one-way clutch 87 of a claw type.

As illustrated in FIG. 4, the first one-way clutch 86 is attached between the second side cover 7 and the handle shaft 30. The first one-way clutch 86 includes an outer race 86a, an inner race 86b, and roller elements 86c. The outer race 86a is attached into the first boss 7c while being prevented from rotating. The first boss 7c is attached to and outwardly protruding from the second side cover 7. The inner race 86b is attached onto the handle shaft 30 while being prevented from rotating. The roller elements 86c are allowed to get stuck between the outer race 86a and the inner race 86b.

As illustrated in FIG. 3, the second one-way clutch 87 includes a ratchet wheel 88 and a ratchet claw 89. The ratchet wheel 88 is attached onto the handle shaft 30 while being unitarily rotatable therewith. The ratchet claw 89 is pivotally attached to the mechanism attachment plate 37. As illustrated in FIG. 4, the ratchet wheel 88 is disposed rearwards of the main gear 31 through a drag disc 65d. The ratchet claw 89 is pivotally attached onto a boss shaft (not illustrated in the figures) that is formed on and protruded from the mechanism attachment plate 37.

The main gear 31 is rotatably attached onto the handle shaft 30. The main gear 31 is frictionally coupled to the handle shaft 30 through the drag mechanism 23. The main gear 31 includes a circular housing recess 31a on the right surface thereof. The housing recess 31a accommodates the drag mechanism 23. The housing recess 31a includes a plurality of (e.g., four) first engaged recesses 31b on the inner peripheral surface thereof. Each first engaged recess 31b is recessed in roughly a semicircular shape. Accordingly, a rotation member 54 to be described is allowed to be engaged with the first engaged recesses 31b while being unitarily rotatable with the main gear 31. Further, the housing recess 31a includes a plurality of (e.g., two) second engaged recesses 31c on the inner peripheral surface thereof. Each second engaged recess 31c is formed between any adjacent two of the first engaged recesses 31b. Each first engaged recess 31b has an inner diameter greater than that of each second engaged recess 31c. Yet further, the housing recess 31a includes a retainer groove 31d on the inner peripheral surface thereof. A retainer member 62 to be described is attached to the retainer groove 31d.

As illustrated in FIG. 2, the pinion gear 32 is a tubular member that the spool shaft 20 penetrates through the center thereof. The pinion gear 32 is inwardly extending from the outside of the second side plate 9. The pinion gear 32 is attached onto the spool shaft 20 while being axially movable. Further, the left end (see FIG. 2) of the pinion gear 32 is supported by the mechanism attachment plate 37 through a bearing 18a while being rotatable and axially movable. The right end (see FIG. 2) of the pinion gear 32 is rotatably supported by the second boss 7f through a bearing 18b attached into the second boss 7f. The pinion gear 32 includes an engaged groove 32a on the left end thereof (see FIG. 2). The engaged groove 32a is engaged with the engagement pin 29. The engaged groove 32a and the engagement pin 29 form the clutch mechanism 21. The bearing 18a is disposed on the outer peripheral surface of the engaged groove 32a. Further, the pinion gear 32 includes a narrowed portion 32b with a small diameter. The narrowed portion 32b is positioned adjacent to the engaged groove 32a. Yet further, the pinion gear 32 includes a gear portion 32c on the intermediate part thereof. The gear portion 32c is meshed with the main gear 31.

As illustrated in FIG. 2, the clutch control mechanism 22 includes a clutch yoke 35. The clutch yoke 35 is engaged with the narrowed portion 32b of the pinion gear 32 for moving the pinion gear 32 along the axial direction of the spool shaft 20. The clutch yoke 35 is configured to be moved rightwards (see FIG. 2) in response to a pivot operation of the clutch lever 17 from a clutch-on position to a clutch-off position. The engagement pin 29 is accordingly disengaged from the engaged groove 32a, and the clutch-off state is produced.

As illustrated in FIG. 2, the casting control mechanism 24 includes a plurality of friction plates 48 and a brake cap 49. The friction plates 48 abut both the ends of the spool shaft 20 from the axial outside of the spool shaft 20. The brake cap 49 is configured to regulate abutting pressure of the friction plates 48 against the spool shaft 20. The left-side friction plates 48 are attached to the center of the first side cover 6. The brake cap 49 is screwed onto the outer peripheral surface of the second boss 7f of the second side cover 7.

Drag Mechanism Structure

As illustrated in FIGS. 2, 3 and 4, the drag mechanism 23 is configured to change drag force in response to an operating position of a star drag 3 for regulating drag force. The drag mechanism 23 is allowed to regulate and brake rotation of the spool 12 in the fishing-line releasing direction. The star drag 3 includes a nut portion 3a screwed onto the second male threaded portion 30c of the handle shaft 30.

The drag mechanism 23 is disposed about the handle shaft 30. The drag mechanism 23 includes (e.g., two) disc springs 50 illustrated in FIG. 2 and first, second, and third drag washers 51, 52, 53 illustrated in FIGS. 3 and 4. The disc springs 50 and the first, second, and third drag washers 51, 52, 53 are pressed by the nut portion 3a of the star drag 3. The disc springs 50 are disposed between the star drag 3 and the bearing 16. The disc springs 50 are configured to transmit spring force, which is changed by axial movement of the star drag 3, to the first drag washer 51 through the bearing 16 and the inner race 86b of the first one-way clutch 86. The first drag washer 51 is coupled to the handle shaft 30 while being unitarily rotatable therewith. Further, the first drag washer 51 is coupled to and axially makes contact with the inner race 86b while being unitarily rotatable therewith. Accordingly, the inner race 86b is allowed to unitarily rotate with the handle shaft 30 while pressing the first drag washer 51.

The second drag washer 52 is coupled to the main gear 31 while being unitarily rotatable therewith. The second drag washer 52 includes a pair of engaging tabs 52a on the outer peripheral surface thereof. Each engaging tab 52a is bent leftwards. The engaging tabs 52a are engaged with the second engaged recesses 31c of the main gear 31.

The third drag washer 53 is engaged with the anti-rotation portion 30a of the handle shaft 30 while being unitarily rotatable with the handle shaft 30. The handle shaft 30 is prevented from being reversely rotated by the first and second one-way clutches 86 and 87. Therefore, the first and third drag washers 51 and 53 are prevented from being rotated in the fishing-line releasing direction even when the main gear 31 is rotated in the fishing-line releasing direction.

A drag disc 65a is attached between the first and second drag washers 51 and 52. A drag disc 65b is attached between the second and third drag washers 52 and 53. A drag disc 65c is attached between the third drag washer 53 and the main gear 31. A drag disc 65d is attached between the main gear 31 and the ratchet wheel 88. The drag discs 65a to 65d are made of carbon, felt, or the like. The ratchet wheel 88 also functions as the drag mechanism 23. The ratchet wheel 88 is disposed for making contact with a large-diameter flanged portion 30d formed on the outer peripheral surface of the handle shaft 30. The ratchet wheel 88 receives pressure of the star drag 3 through the flanged portion 30d.

Drag Sound Producing Mechanism Structure

Figure 5:
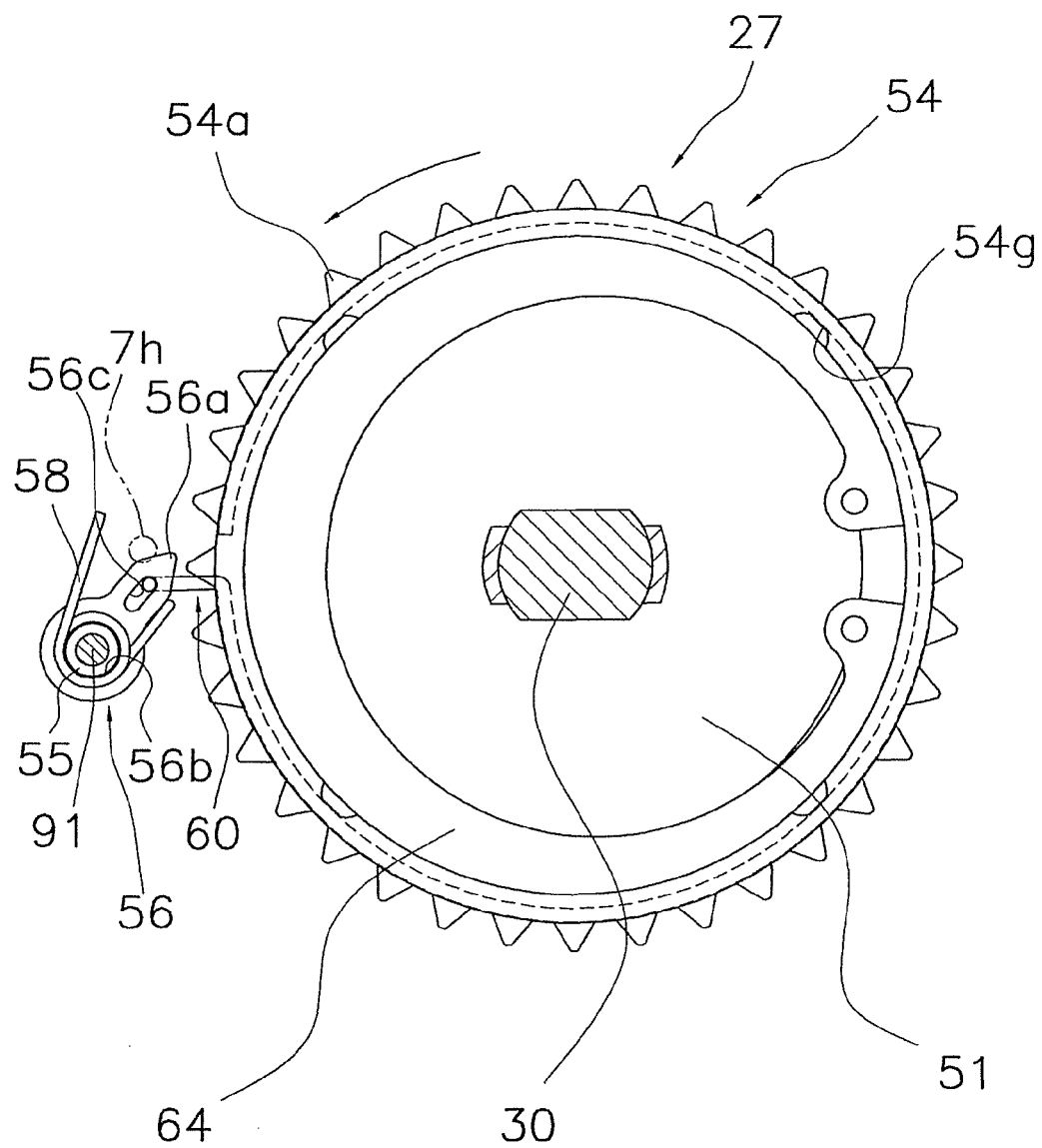
FIG. 5 is a front view of the drag sound producing mechanism.

As illustrated in FIGS. 3, 4 and 5, the drag sound producing mechanism 27 according to the first exemplary embodiment of the present invention includes the rotation member 54, a pivot shaft 55, a hitting member 56, a drive mechanism 57, and an urging member 58. The rotation member 54 for producing sounds is unitarily rotatable with the main gear 31. The pivot shaft 55 is mounted on the second side cover 7.

As illustrated in FIGS. 3, 4 and 5, the rotation member 54 is a ring-shaped member disposed on the outer peripheral side of the first drag washer 51. The rotation member 54 includes a plurality of sound producing convexes 54a on the outer peripheral surface thereof. The sound producing convexes 54a are circumferentially aligned at predetermined intervals. Each sound producing convex 54a has, for instance, a wedge shape. The rotation member 54 has an inner diameter greater than the outer diameters of the first and third drag washers 51 and 53. Therefore, the first and third drag washers 51 and 53 are allowed to pass through the rotation member 54. Further, the rotation member 54 includes check recesses 54g (see FIG. 5) on the inner peripheral surface thereof. However, the engaging tabs 52a of the second drag washer 52 are prevented from passing through the check recesses 54g. The check recesses 54g are formed for visually checking and easily executing attachment of the retainer member 62 to be described.

As illustrated in FIG. 3 and an enlarged section A of FIG. 4, the rotation member 54 includes a drive member attachment portion 54b on a rear surface 54d opposed to the main gear 31. The drive member attachment portion 54b includes a plurality of (e.g., four) engaging protrusions 54c. The engaging protrusions 54c are aligned at predetermined intervals along the circumferential direction of the rotation member 54. The engaging protrusions 54c are engaged with the first engaged recesses 31b of the main gear 31. The drive member attachment portion 54b serves to attach the drive mechanism 57 to the rotation member 54. The drive member attachment portion 54b has a diameter less than that of the circumferentially aligned sound producing convexes 54a. The drive member attachment portion 54b includes an annular attachment groove 54e. The annular attachment groove 54e includes the base ends of the engaging protrusions 54c while being annularly disposed adjacent to the sound producing convexes 54a. Therefore, the attachment groove 54e includes tip-side sidewall portions 54h in the positions where the engaging protrusions 54c are formed. To clearly illustrating this arrangement, FIG. 4 omits illustrating the engaging protrusions 54c in a part of the rotation member 54 positioned below the axis of the handle shaft 30.

Each engaging protrusion 54c includes a retainer groove 54f on the inner surface thereof. The retainer member 62 is attached to the retainer grooves 54f for preventing the rotation member 54 from being detached from the main gear 31. The retainer grooves 54f are aligned with the retainer groove 31d formed on the main gear 31 along the circumferential direction of the retainer groove 31d. The retainer member 62 is attached to the two retainer grooves 31d and 54f. Accordingly, the rotation member 54 is coupled to the main gear 31 while being unitarily rotatable therewith. As illustrated in FIG. 3, the retainer member 62 is a C-shaped spring member formed by a wire.

To reinforce the rotation member 54, a reinforcement member 64 is detachably attached to the inner peripheral surface of the rotation member 54 as illustrated in FIGS. 3, 4 and 5. For example, a snap ring (retainer ring) is used as the reinforcement member 64. The reinforcement member 64 has an outer diameter greater than the inner diameter of the rotation member 54. Further, the rotation member 54 includes a positioning step 54i on the inner peripheral surface thereof. The reinforcement member 64 is appropriately positioned by the positioning step 54i.

As illustrated in FIGS. 3 and 5, the pivot shaft 55 supports the hitting member 56 for allowing it to pivot. The pivot shaft 55 is a hollow bushing member made of metal such as stainless alloy. The pivot shaft 55 includes a large-diameter flanged portion 55a and a small-diameter pivot support portion 55b.

The second side cover 7 includes a tubular shaft attachment boss 7g on the inner surface thereof. The shaft attachment boss 7g is protruded towards the mechanical attachment plate 37. A shaft fixation bolt 91 is screwed into the shaft attachment boss 7g for fixing the pivot shaft 55. The shaft fixation bolt 91 is screwed therein while penetrating through the pivot shaft 55.

The hitting member 56 is attached onto the pivot shaft 55 while being allowed to pivot from a silent position (see FIG. 5) to a sound producing position and further to a position opposite to the silent position across the sound producing position. In the silent position, the hitting member 56 is separated away from the sound producing convexes 54a. In the sound producing position, on the other hand, the hitting member 56 is allowed to make contact with the sound producing convexes 54a. The hitting member 56 is a bilaterally symmetric plate member made of metal such as stainless alloy.

The hitting member 56 includes a claw portion 56a on the front end thereof. Further, the hitting member 56 includes an attachment hole 56b on the base end thereof. The attachment hole 56b is attached onto the pivot shaft 55. The attachment hole 56b has an inner diameter greater than the outer diameter of the pivot support portion 55b of the pivot shaft 55. When the outer diameter of the pivot support portion 55b is 3.5 mm, for instance, the inner diameter of the attachment hole 56b falls in a range of 3.7 to 4.0 mm. Accordingly, the hitting member 56 is attached on the pivot shaft 55 to move radially at a predetermined distance from the pivot shaft 55.

The hitting member 56 includes an oval holding slit 56c formed adjacent to the claw portion 56a. The holding slit 56c is formed for holding the drive mechanism 57.

As illustrated in FIG. 3, the drive mechanism 57 includes a drive member 60 having a question mark shape. The drive member 60 is an elastic wire member. The drive member 60 includes a circular-arc frictional coupling portion 60a and a hook portion 60b. The frictional coupling portion 60a is allowed to frictionally coupled and attached to the bottom of the attachment groove 54e of the drive member attachment portion 54b. The hook portion 60b is bent radially outwards from the friction coupling portion 60a. The tip of the hook portion 60b is held by the holding slit 56c of the hitting member 56. The frictional coupling portion 60a has an inner diameter less than the outer diameter of the attachment groove 54e. The frictional coupling portion 60a is thereby frictionally coupled to the attachment groove 54e. Friction of the frictional coupling portion 60a is increased in proportion to reduction in the inner diameter of the frictional coupling portion 60a. When friction is increased, greater force is required to rotate the handle 2 for rotating the spool 12 in the fishing-line winding direction. Therefore, it is preferable to reduce friction as much as possible.

The urging member 58 is a torsion coil spring. One end of the urging member 58 is held by the hitting member 56, while the other end of the urging member 58 is held by a spring holding protrusion 7h formed on the inner surface of the second side cover 7. When disposed in the silent position illustrated in FIG. 5 the urging member 58 is configured not to urge the hitting member 56. In other words, the silent position is set as a position where the urging member 58 does not urge the hitting member 56 while the aforementioned other end of the urging member 58 is detached from the spring holding protrusion 7h. On the other hand, the urging member 58 is configured to urge the hitting member 56 towards the sound producing position when the hitting member 56 is pressed by the rotation member 54 and is further pivoted opposite to the silent position across the sound producing position.

Reel Actions in Actual Fishing

In fishing, the clutch lever 17 is firstly slid and set to be in the clutch-off position for setting the clutch mechanism 21 to be in the clutch-off state. Under the condition, the fishing rod is cast for releasing the fishing line from the spool 12. The spool 12 is rotated in the fishing-line releasing direction. However, the main gear 31 is not rotated because the clutch mechanism 21 is set to be in the clutch-off state. Therefore, the drag sound producing mechanism 27 does not produce sounds. When a terminal tackle lands in water, the handle 2 is slightly rotated in the fishing-line winding direction. A clutch return mechanism (not illustrated in the figure) is accordingly activated, and the clutch mechanism 21 is returned to the clutch-on state.

Under the condition, an angler waits for a fish to be hooked by the terminal tackle. When a fish is hooked by the terminal tackle, the handle 2 is rotated in the fishing-line winding direction for pulling and catching the hooked fish. The main gear 31 is herein rotated in the fishing-line winding direction (i.e., a clockwise direction in FIG. 3). In conjunction, the rotation member 54 and the drive member 60 frictionally coupled thereto are rotated in the fishing-line winding direction. When the drive member 60 is rotated in the fishing-line winding direction, the hitting member 56 pivots in the counterclockwise direction in FIG. 3. When pivoting in the counterclockwise direction, the hitting member 56 is appropriately positioned in the silent position illustrated in FIG. 5. The aforementioned other end of the urging member 58 is herein detached from the spring holding protrusion 7h. Therefore, the urging member 58 does not produce urging force. Therefore, the drive member 60 is only required to produce small friction enough to cause the hitting member 56 to pivot. When the hitting member 56 is set to be in the silent position, the drive member 60 stops rotating and slippage occurs between the drive member 60 and the rotation member 54. However, the drive member 60 should produce small friction for causing the hitting member 56 to pivot. Therefore, rotational resistance due to friction will be reduced. Consequently, it is possible to inhibit reduction in rotational efficiency due to frictional coupling of the drive mechanism 57 in winding the fishing line.

The drag mechanism 23 is activated when the fish, which is hooked by the terminal tackle, pulls the fishing line with a force greater than or equal to a predetermined drag force under the condition. Specifically, the spool 12 is rotated in the fishing-line releasing direction under the clutch-on state and the main gear 31 is reversely rotated in the fishing-line releasing direction (i.e., the counterclockwise direction in FIG. 3). However, the first and second one-way clutches 86 and 87 prevent the handle shaft 30 from reversely rotating in the fishing-line releasing direction. The main gear 31 is accordingly rotated in the fishing-line releasing direction while being braked by the predetermined drag force. When the main gear 31 is rotated in the fishing-line releasing direction, the rotation member 54 is also rotated in the fishing-line releasing direction depicted with an arrow in FIG. 5. When the rotation member 54 is rotated in the fishing-line releasing direction, the drive member 60 is rotated in the fishing-line releasing direction. The drive member 60 pulls the hitting member 56 for causing the hitting member 56 to pivot in the clockwise direction from the silent position illustrated in FIG. 5 to the sound producing position where the hitting member 56 is allowed to make contact with the rotation member 54.

When the hitting member 56 reaches the sound producing position, the urging member 58 urges the hitting member 56 towards the sound producing position. Accordingly, the hitting member 56, which is urged by the urging member 58, repeatedly hits the sound producing convexes 54a of the rotation member 54 configured to rotate in conjunction with the main gear 31. The drag sound producing mechanism 27 thus produces sounds.

Procedure of Assembling Drag Mechanism

In assembling the drag mechanism 23, components of the drag mechanism 23 including the ratchet wheel 88 of the second one-way clutch 87 and the main gear 31 are sequentially attached onto the handle shaft 30. When the components of the drag mechanism 23 are completely attached onto the handle shaft 30, the drive member 60 is attached to the attachment groove 54e of the rotation member 54 and the rotation member 54 is attached to the main gear 31. Subsequently, the retainer member 62 is bent and attached to the retainer groove 31d of the main gear 31 and the retainer groove 54f of the rotation member 54 from the inner peripheral side of the rotation member 54. Accordingly, the rotation member 54 is prevented from being detached from the main gear 31. It is possible to visually check whether or not the retainer member 62 is reliably attached to the retainer groove 31d through the check recesses 54g. After attaching the retainer member 62, the reinforcement member 64 is attached to the rotation member 54.

Next, the second side cover 7 is fixed to the mechanism attachment plate 37 and the second side plate 9 under the condition that the hitting member 56 and the urging member 58 are preliminarily attached to the second side cover 7. Prior to fixation of the second side cover 7, the hook portion 60b of the drive member 60 is positioned to be visible through the opening 7d. Subsequently, the hook portion 60b is held by the holding slit 56c using a tool (e.g., a pair of tweezers) inserted through the opening 7d.

The hitting member 56 and the rotation member 54 are disposed closer to the second side cover 7 than the main gear 31 is. In other words, the hitting member 56 and the rotation member 54 are disposed forwards of the main gear 31. Accordingly, the hitting member 56 and the rotation member 54 can be easily assembled.

Second Exemplary Embodiment

In a second exemplary embodiment, structures of a main gear 131 of a gear mechanism 119, a first drag washer 151 of a drag mechanism 123, and a rotation member 154 of a drag sound producing mechanism 127 are different from those of the corresponding components in the first exemplary embodiment. It should be noted that the following explanation only relates to differences of the second exemplary embodiment from the first exemplary embodiment.

Figure 6:
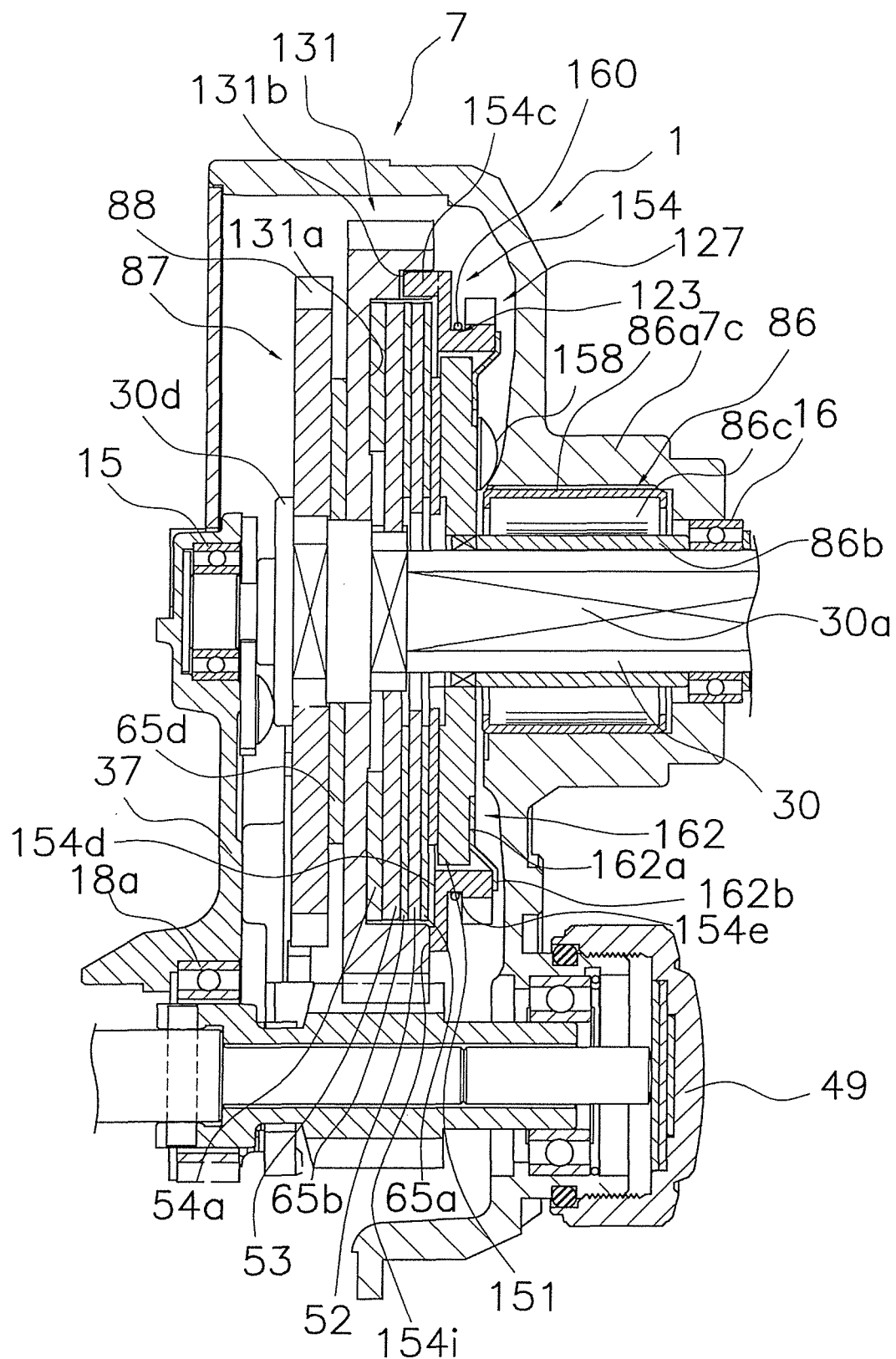
FIG. 6 is a diagram corresponding to FIG. 4 in a second exemplary embodiment.

As illustrated in FIG. 6, the main gear 131 includes a circular housing recess 131a on the right surface thereof. The housing recess 131a accommodates the drag mechanism 123. The housing recess 131a includes a plurality of (e.g., four) first engaged recesses 131b on the inner peripheral surface thereof. Each first engaged recesses 131b is recessed in roughly a semicircular shape. Accordingly, the rotation member 154 is allowed to be engaged with the first engaged recesses 131b while being unitarily rotatable with the main gear 131. The housing recess 131a includes a plurality of (e.g., two) second engaged recesses (not illustrated in the figure) on the inner peripheral surface thereof. The second engaged recesses have the same structures as those of the first exemplary embodiment. Each second engaged recess is formed between any adjacent two of the first engaged recesses 131b.

The first drag washer 151 of the drag mechanism 123 has a diameter less than that of the drag washer 51 of the first exemplary embodiment. Further, the rotation member 154, which is disposed on the outer peripheral side of the first drag washer 151, also has a diameter less than that of the rotation member 54 of the first exemplary embodiment. Consequently, a part of the components forming the drag mechanism 123 is prevented from passing through the rotation member 154 although a part of the components forming the drag mechanism 23 is allowed to pass through the rotation member 54 in the first exemplary embodiment. Further, the rotation member 154 is not prevented from being detached from the main gear 131. In other words, a component corresponding to the retainer member 62 is not disposed between the main gear 131 and the rotation member 154.

Figure 7:
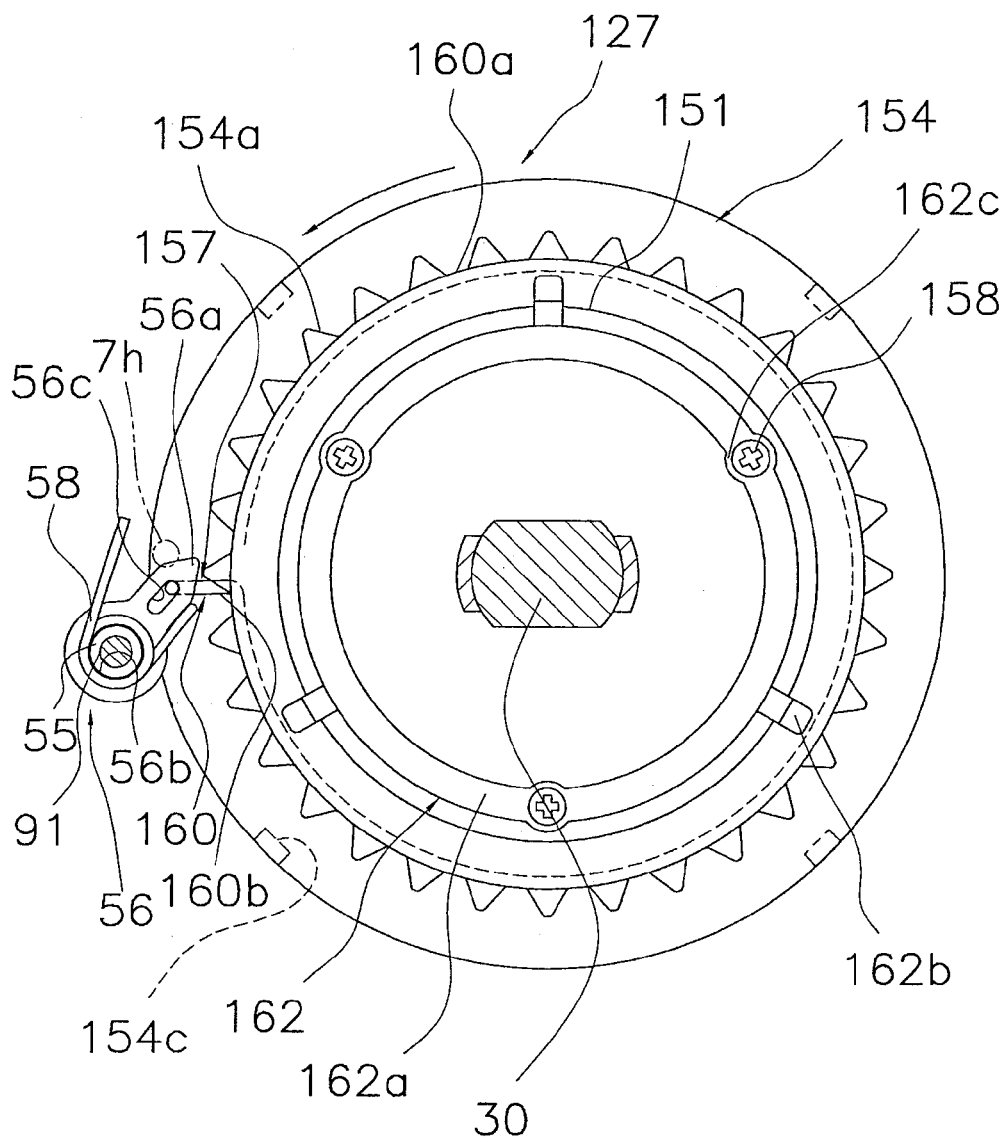
FIG. 7 is a diagram corresponding to FIG. 5 in the second exemplary embodiment.

As illustrated in FIGS. 6 and 7, the drag sound producing mechanism 127 of the second exemplary embodiment includes the rotation member 154, the pivot shaft 55, the hitting member 56, a drive mechanism 157, and the urging member 58. The rotation member 154 for producing sounds is unitarily rotatable with the main gear 131. The pivot shaft 55 is mounted on the second side cover 7.

The rotation member 154 is a ring-shaped member disposed on the outer peripheral side of the first drag washer 151. The rotation member 154 includes a plurality of sound producing convexes 154a on the outer peripheral surface thereof. The sound producing convexes 154a are circumferentially aligned at predetermined intervals. Each sound producing convex 154a has, for instance, a wedge shape. The rotation member 154 has an inner diameter less than the outer diameters of the second and third drag washers 52 and 53. Therefore, the second and third drag washers 52 and 53 are prevented from passing through the rotation member 154.

The rotation member 154 includes a drive member attachment portion 154b on a rear surface 154d opposed to the main gear 131. The drive member attachment portion 154b includes a plurality of (e.g., four) engaging protrusions 154c. The engaging protrusions 154c are aligned at predetermined intervals along the circumferential direction of the rotation member 154. The engaging protrusions 154c are engaged with the first engaged recesses 131b of the main gear 131. The drive member attachment portion 154b is configured to attach a drive member 160 of the drive mechanism 157 to the rotation member 154. The drive member attachment portion 154b includes an annular attachment groove 154e that the drive member 160 is attached. The attachment groove 154e is annularly formed on a part of the outer peripheral surface of the drive member attachment portion 154b while being disposed closer to the sound producing convexes 154a than to the engaging protrusions 154c. Therefore, the drive member 160 has a diameter less than that of the corresponding component of the first exemplary embodiment. Likewise, the attachment groove 154e has a diameter less than that of the corresponding component of the first exemplary embodiment. Further, the rotation member 154 includes an abutment surface 154i on the main gear 131 side of the attachment groove 154e. The abutment surface 154i abuts the right surface (i.e., a lateral surface closer to the second side cover 76) of the main gear 131. The engaging protrusions 154c are protruded from the abutment surface 154i towards the main gear 131. Therefore, the engaging protrusions 154c are engaged with the main gear 131 at positions radially outward of the sound producing convexes 154a.

In the second exemplary embodiment, a press member 162 is fixed to the first drag washer 151 by a plurality of (e.g., three) screw members 158 screwed into the first drag washer 151 for preventing the rotation member 154 from being detached from the main gear 131. The press member 162 is a plate-shaped member including a ring-shaped fixation portion 162a and a plurality of (e.g., three) press portions 162b radially extended from the fixation portion 162a. The fixation portion 162a includes a plurality of (e.g., three) circular screw attachment portions 162c circumferentially aligned at predetermined intervals. The press portions 162b and the screw attachment portions 162c are disposed at equal intervals. The press portions 162b are obliquely extended axially outwards (i.e., rightwards in FIG. 6) from the fixation portion 162a. The tip of each press portion 162b makes contact with and slightly presses the right surface of the rotation member 154. Accordingly, the rotation member 154 is prevented from being detached from the main gear 131. In the second exemplary embodiment, the rotation member 154 is prevented from being detached from the main gear 131 by fixing the press member 162 to the first drag washer 151 after the drag mechanism 123 is embedded in the main gear 131.

Similarly to the aforementioned first exemplary embodiment, the rotation member 154 is disposed on the outer peripheral side of the drag mechanism 123 while being overlapped with the drag mechanism 123 in the second exemplary embodiment with the aforementioned structure. Therefore, the drag sound producing mechanism 127 can be disposed in the dual-bearing reel without increasing the length of the dual-bearing reel in the axial direction of the handle shaft as much as possible.

Features (A) The drag sound producing mechanism 27 (or 127) is a mechanism disposed in the dual-bearing reel configured to wind the fishing line about the axis in parallel to the handle shaft 30 rotatably attached to both the second side cover 7 and the frame 5 of the reel unit 1. The drag sound producing mechanism 27 (or 127) is configured to produce sounds in conjunction with activation of the drag mechanism 23 (or 123). The drag sound producing mechanism 27 (or 127) includes the rotation member 54 (or 154), the pivot shaft 55, the hitting member 56, the drive mechanism 57 (or 157), and the urging member 58. The rotation member 54 (or 154) is disposed closer to the second side cover 7 while being unitarily rotatable with the main gear 31 (or 131). The rotation member 54 (or 154) includes a plurality of the sound producing convexes 54a (or 154a) on the outer peripheral surface thereof. The sound producing convexes 54a (or 154a) are circumferentially aligned at predetermined intervals. The pivot shaft 55 is mounted on the second side cover 7. The hitting member 56 is attached to the pivot shaft 55 while being allowed to radially move at a predetermined distance and allowed to pivot between the silent position where the hitting member 56 is separated away from the sound producing convexes 54a (or 154a) and the position opposite to the silent position across the sound producing position where the hitting member 56 is allowed to make contact with the sound producing convexes 54a (or 154a). The drive mechanism 57 (or 157) is configured to cause the hitting member 56 to pivot from the sound producing position to the silent position in conjunction with rotation of the main gear 31 (or 131) in the fishing-line winding direction. The urging member 58 is configured to urge the hitting member 56 towards the sound producing position.

In the drag sound producing mechanism 27 (or 127), the drive mechanism 57 (or 157) sets the hitting member 56 to be in the silent position when the rotation member 54 (or 154), including the sound producing convexes 54a (or 154a) on the outer periphery thereof, is rotated in the fishing-line winding direction. Accordingly, the drag sound producing mechanism 27 (or 127) does not produce sounds. On the other hand, the hitting member 56 is set to be in the sound producing position by the action of either the urging member 58 or the drive mechanism 57 (or 157) when the drag mechanism 23 (or 123) is activated and the rotation member 54 (or 154) is rotated together with the main gear 31 (or 131) in the fishing-line releasing direction. When the hitting member 56 is set to be in the sound producing position, the hitting member 56 repeatedly hits a plurality of the sound producing convexes 54a (or 154a) while being urged by the urging member 58. Accordingly, the drag sound producing mechanism 27 (or 131) produces sounds. The rotation member 54 (or 154) is disposed on the second side cover 7 side of the main gear 31 (or 127) while being unitarily rotatable with the main gear 31 (or 131). Further, the hitting member 56 pivots about the pivot shaft 55 mounted on the second side cover 7 while being allowed to make contact with the sound producing convexes 54a (or 154a) of the rotation member 54 (or 154). Therefore, the hitting member 56 and the rotation member 54 (or 154) are disposed forwards of the main gear 31 (or 131), i.e., disposed closer to the second side cover 7 than the main gear 31 (or 131) is. Only the first drag washer 51 and the like of the drag mechanism 23 (or 123) are normally disposed on the second side cover 7 side of the main gear 31 (or 131). Therefore, the rotation member 54 (or 154) can be disposed while being at least partially overlapped with the first drag washer 51 (or 151) in the axial direction of the handle shaft. Therefore, chances that the above structure affects the length of the dual-bearing reel in the axial direction of the handle shaft are low. Consequently, the drag sound producing mechanism 27 (or 127) can be disposed in the dual-bearing reel without increasing the length of the dual-bearing reel in the axial direction of the handle shaft.

Also, when the tip of the hitting member 56 and the tip of a given sound producing convex 54a (or 154a) make contact each other and are to be stuck in the drag activation, the hitting member 56 radially moves because the hitting member 56 is attached onto the pivot shaft 55 while being allowed to radially move at a predetermined distance. Occurrence of being stuck is consequently avoided between the rotation member 54 (or 154) and the hitting member 56. Therefore, the drag mechanism 23 (or 123) smoothly operates. Further, abrasion can be reduced in either the rotation member 54 (154) or the hitting member 56.

(B) In the drag sound producing mechanism 27 (or 127), at least a part of the rotation member 54 (or 154) is disposed on the outer peripheral side of the first drag washer 51 (or 151) of the drag mechanism 23 (or 123) while being overlapped with the first drag washer 51 (or 151) in the axial direction of the handle shaft. In this case, the drag sound producing mechanism 27 (or 127) can be disposed in the dual-bearing reel without increasing the length of the dual-bearing reel in the axial direction of the handle shaft, because at least a part of the rotation member 54 (or 154) is disposed on the outer peripheral side of the first drag washer 51 (or 151) while being overlapped with the first drag washer 51 (or 151) in the axial direction of the handle shaft.

(C) In the drag sound producing mechanism 27 (or 127), the drive mechanism 57 (or 157) includes the question-mark shaped drive member 60 (or 160) formed by an elastic wire. The drive member 60 (or 160) includes the circular-arc shaped frictional coupling portion 60a (or 160a) and the hook portion 60b (or 160b) bent radially outwards from the frictional coupling portion 60a (or 160a). The tip of the hook portion 60b (or 160b) is held by the hitting member. The rotation member 54 (or 154) includes the drive member attachment portion 54b (or 154b). The drive member attachment portion 54b (or 154b) includes the attachment groove 54e (or 154e) that the frictional coupling portion 60a (or 160a) is frictionally engaged. The attachment groove 54e (or 154e) is aligned with the sound producing convexes 54a (or 154a). In this case, the drive mechanism 57 (or 157) can be assembled only by attaching the frictional coupling portion 60a (or 160a) to the attachment groove 54e (or 154e) and making the hitting member 56 hold the hook portion 60b (or 160b). Therefore, the drive mechanism 57 (or 157) can be easily assembled.

(D) In the drag sound producing mechanism 27 (or 127), the drive member attachment portion 54b (or 154b) includes the engaging protrusions 54c (or 154c). The engaging protrusions 54c (or 154c) are protruded towards the main gear 31 (or 131) while being circumferentially aligned at predetermined intervals. The engaging protrusions 54c (or 154c) are engaged with the main gear 31 (or 131) while being unitarily rotatable therewith. In this case, the rotation member 54 (or 154) is engaged with the main gear 31 (or 131) while the drive member attachment portion 54b (or 154b) includes the engaging protrusions 54c (or 154c) circumferentially aligned at predetermined intervals. Therefore, the rotation member 54 (or 154) can be formed with a simple structure and this makes it easier to assemble the drag sound producing mechanism 27.

(E) In the drag sound producing mechanism 27, the attachment groove 54e is annularly formed adjacent to the sound producing convexes 54a while including the base ends of the engaging protrusions 54c. In this case, the attachment groove 54e is annularly formed adjacent to the sound producing convexes 54a while including a part of each engaging protrusion 54c to be engaged with the main gear 31. The engaged part of the main gear 31 and the sound producing convexes 54a are thereby disposed adjacent to each other. Accordingly, the rotation member 54 can be formed with a simple structure.

(F) In the drag sound producing mechanism 127, the attachment groove 154e is annularly formed on a part of the outer peripheral surface of the rotation member 154 while being disposed closer to the sound producing convexes 154a than to the engaging protrusions 154c. The engaging protrusions 154c are engaged with the main gear 131 at positions radially outward of the sound producing convexes 154a. In this case, the rotation member 154 is allowed to be unitarily rotated with the main gear 131 even when the entire sound producing convexes 154a have a diameter less than that of the main gear 131, because the engaging protrusions 154c are engaged with the main gear 131 at positions radially outward of the sound producing convexes 154a.

(G) In the drag sound producing mechanism 27, the hook portion 60b of the drive member 60, which is held by the hitting member 56, is faced to the opening 7d formed in the second side cover 7. Thus, the opening 7d is herein opened to be faced to the hook portion 60b. It is thereby easy to execute an operation of making the hitting member 56 hold the hook portion 60b by using a tool inserted through the opening 7d.

Other Exemplary Embodiments

Exemplary embodiments of the present invention have been described above. However, the present invention is not limited to the aforementioned exemplary embodiments. A variety of changes can be made herein without departing from the scope of the present invention.

(a) In the aforementioned exemplary embodiment, the drive mechanism 57 is frictionally coupled to the rotation member 54. In the present invention, however, the component that the drive mechanism 57 is frictionally coupled is not limited to the above. For example, the drive mechanism 57 can be frictionally coupled to the main gear 31.

(b) In the aforementioned exemplary embodiments, the rotation member is prevented from being detached from the main gear by either the retainer spring or the press member. In the present invention, however, the retaining method of the rotation member is not limited to the above. For example, the rotation member can be prevented from being detached from the main gear 131 by the structure that the rotation member is elastically engaged with and coupled to the main gear.

(c) In the aforementioned exemplary embodiments, the rotation member is coupled to the main gear in a unitarily rotatable state while being disposed onto the handle shaft. In the present invention, however, the structure of the rotation member is not limited to the above. For example, a member to be meshed with the main gear can be used as the rotation member.

(d) In the aforementioned exemplary embodiments, the opening 7d is covered with the name plate 36. However, a detachable cap or the like can be attached to the opening 7d. For example, a cap elastically engaged with the opening 7d or a cap screwed into the opening 7d can be herein used.

(e) In the aforementioned exemplary embodiments, the round dual-bearing reel has been exemplified as the deal-bearing reel of the present invention. However, any suitable types of the dual-bearing reels can be used, such as the non-round bait casting reels, the electronic reels and the lever drag reels.

(f) In the aforementioned exemplary embodiment, the attachment groove 54e is disposed on the main gear 31 side of the sound producing convexes 54a. In the present invention, however, arrangement of the attachment groove 54e is not limited to the above. For example, the attachment groove can be disposed on the opposite side of the main gear 31 through the sound producing convexes 54a. In this case, it is easy to reduce the groove diameter of the attachment groove as much as possible.

(g) In the aforementioned exemplary embodiment, the rotation member 54 is attached to the main gear 31 after the components of the drag mechanism 23 are attached to the main gear 31. In the present invention, however, the order of attaching the rotation member 54 and the drag mechanism 23 to the main gear 31 is not limited to the above. For example, when the check recesses 54g are sized for allowing the engaging tabs 52a of the second drag washer 52 to pass therethrough, the first to third drag washers 51 to 53 of the drag washer 23 can be attached to the main gear 31 after the rotation member 54 is attached to the main gear 31.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel drag sound producing device for a dual-bearing reel configured to wind a fishing line about an axis arranged in parallel to a handle shaft rotatably attached to both a side cover and a frame of a reel unit of the dual-bearing reel, the dual-bearing reel drag sound producing device configured to produce sound in conjunction with using a drag mechanism, the dual-bearing reel drag sound producing device comprising:

a rotation member disposed adjacent to the side cover to rotate unitarily with a main gear, the rotation member including a plurality of sound producing convexes on an outer peripheral surface thereof, the sound producing convexes being circumferentially aligned at predetermined intervals;

a pivot shaft being configured on the side cover;

a hitting member being attached on the pivot shaft to move in a direction away from the rotation member and configured to pivot about the pivot shaft from a silent position to a sound producing position and further to a position, the silent position being for allowing the hitting member to be separate away from the sound producing convexes, the sound producing position being for allowing the hitting member to make contact with the sound producing convexes, the position being opposite to the first silent position across the sound producing position;

a drive mechanism configured to cause the hitting member to pivot from the sound producing position to the silent position in conjunction with rotation of the main gear in a fishing-line winding direction; and an urging member configured to urge the hitting member towards the sound producing position.

2. The dual-bearing reel drag sound producing device according to claim 1, wherein a part of the rotation member is disposed on an outer peripheral side of a drag washer of the drag mechanism for overlapping with the drag washer in an axial direction of the handle shaft.

3. The dual-bearing reel drag sound producing device according to claim 2, wherein the drive mechanism includes a question-mark shaped drive member being formed by an elastic wire, the drive member including a circular-arc shaped frictional coupling portion, and a hook portion bent radially outwards from the frictional coupling portion, the hook portion having a tip to be held by the hitting member, the rotation member includes a drive member attachment portion, the drive member attachment portion including an attachment groove for allowing the frictional coupling portion to be frictionally engaged therewith, and the attachment groove is aligned with the sound producing convexes along the axial direction of the handle shaft.

4. The dual-bearing reel drag sound producing device according to claim 3, wherein the drive member attachment portion includes a plurality of engaging protrusions being circumferentially aligned at predetermined intervals, the engaging protrusions protrude towards the main gear, and the engaging protrusions are engaged with the main gear when the main gear unitarily rotates with the rotation member.

5. The dual-bearing reel drag sound producing device according to claim 4, wherein the attachment groove includes base ends of the engaging protrusions, and the attachment groove is annularly formed adjacent to the sound producing convexes.

6. The dual-bearing reel drag sound producing device according to claim 4, wherein the attachment groove is annularly formed on a part of an outer peripheral surface of the drive member attachment portion, the attachment groove is disposed closer to the sound producing convexes than to the engaging protrusions, and the engaging protrusions are engaged with the main gear at positions radially outward of the sound producing convexes.

7. The dual-bearing reel drag sound producing device according to one of claim 3, wherein the hook portion of the drive member is facing to an opening formed in the side cover.

* * * * *